(12) United States Patent
Martindale

(10) Patent No.: US 10,214,187 B1
(45) Date of Patent: Feb. 26, 2019

(54) TRAILER JACKING SYSTEM

(71) Applicant: Rex Martindale, Greenwood, IN (US)

(72) Inventor: Rex Martindale, Greenwood, IN (US)

( * ) Notice: Subject to any disclaimer, the term of this patent is extended or adjusted under 35 U.S.C. 154(b) by 0 days.

(21) Appl. No.: 15/678,261

(22) Filed: Aug. 16, 2017

(51) Int. Cl.
*B60S 9/00* (2006.01)
*B60S 9/08* (2006.01)
*B60D 1/66* (2006.01)
*B66F 7/10* (2006.01)
*B66F 1/00* (2006.01)

(52) U.S. Cl.
CPC .......... *B60S 9/08* (2013.01); *B60D 1/66* (2013.01); *B66F 1/00* (2013.01); *B66F 7/10* (2013.01)

(58) Field of Classification Search
CPC ...... B60S 9/00; B60S 9/02; B60S 9/04; B60S 9/06; B60S 9/10; B60S 9/14; B60S 9/22
See application file for complete search history.

(56) References Cited

U.S. PATENT DOCUMENTS

| | | | |
|---|---|---|---|
| 3,523,698 A | 8/1970 | Bishop | |
| 3,733,051 A | 5/1973 | Bollinger | |
| 3,951,383 A | 4/1976 | Tenney, Jr. | |
| 4,176,825 A | 12/1979 | Schwebke | |
| 5,215,289 A | 6/1993 | Jacobson | |
| D656,289 S | 3/2012 | Crump | |
| 2006/0081754 A1 | 4/2006 | Jackson | |
| 2008/0315538 A1* | 12/2008 | Ogle | B60S 9/06 280/6.153 |
| 2016/0311284 A1* | 10/2016 | Osborne | B60G 17/005 |

* cited by examiner

*Primary Examiner* — James A Shriver, II
*Assistant Examiner* — James J Triggs

(57) ABSTRACT

A trailer jacking system includes a trailer that has a pair of axles, a first lateral side and a second lateral side. A pair of bars is provided and each of the bars is coupled between each of the axles. A jack is selectively positioned beneath the bars for jacking the trailer. Each of the bars is oriented collinear with an associated one of the first and second lateral sides. In this way each of the bars facilitates the trailer to be leveled between the first and second lateral sides when the trailer is jacked. A plurality of u-bolts is provided and each of the u-bolts bolts is coupled between the bars and an associated one of the axles to retain the bars on the axles.

7 Claims, 3 Drawing Sheets

TRAILER JACKING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to jacking devices and more particularly pertains to a new jacking device for jacking and leveling a trailer.

BRIEF SUMMARY OF THE INVENTION

An embodiment of the disclosure meets the needs presented above by generally comprising a trailer that has a pair of axles, a first lateral side and a second lateral side. A pair of bars is provided and each of the bars is coupled between each of the axles. A jack is selectively positioned beneath the bars for jacking the trailer. Each of the bars is oriented collinear with an associated one of the first and second lateral sides. In this way each of the bars facilitates the trailer to be leveled between the first and second lateral sides when the trailer is jacked. A plurality of u-bolts is provided and each of the u-bolts bolts is coupled between the bars and an associated one of the axles to retain the bars on the axles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
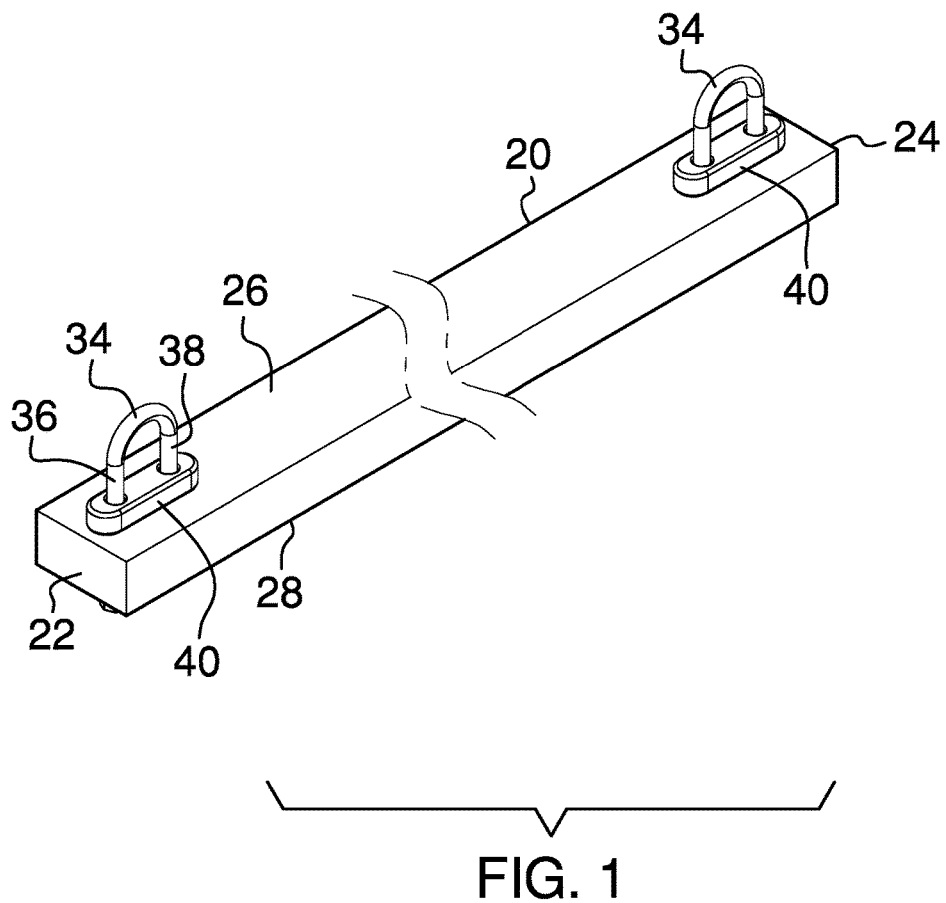
FIG. 1 is a top perspective view of a bar of a trailer jacking system according to an embodiment of the disclosure.
Figure 2:
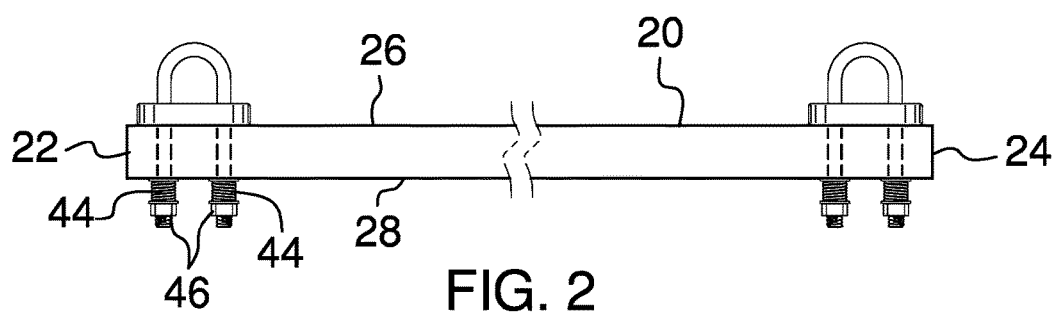
FIG. 2 is a right side view of a bar of an embodiment of the disclosure.
Figure 3:
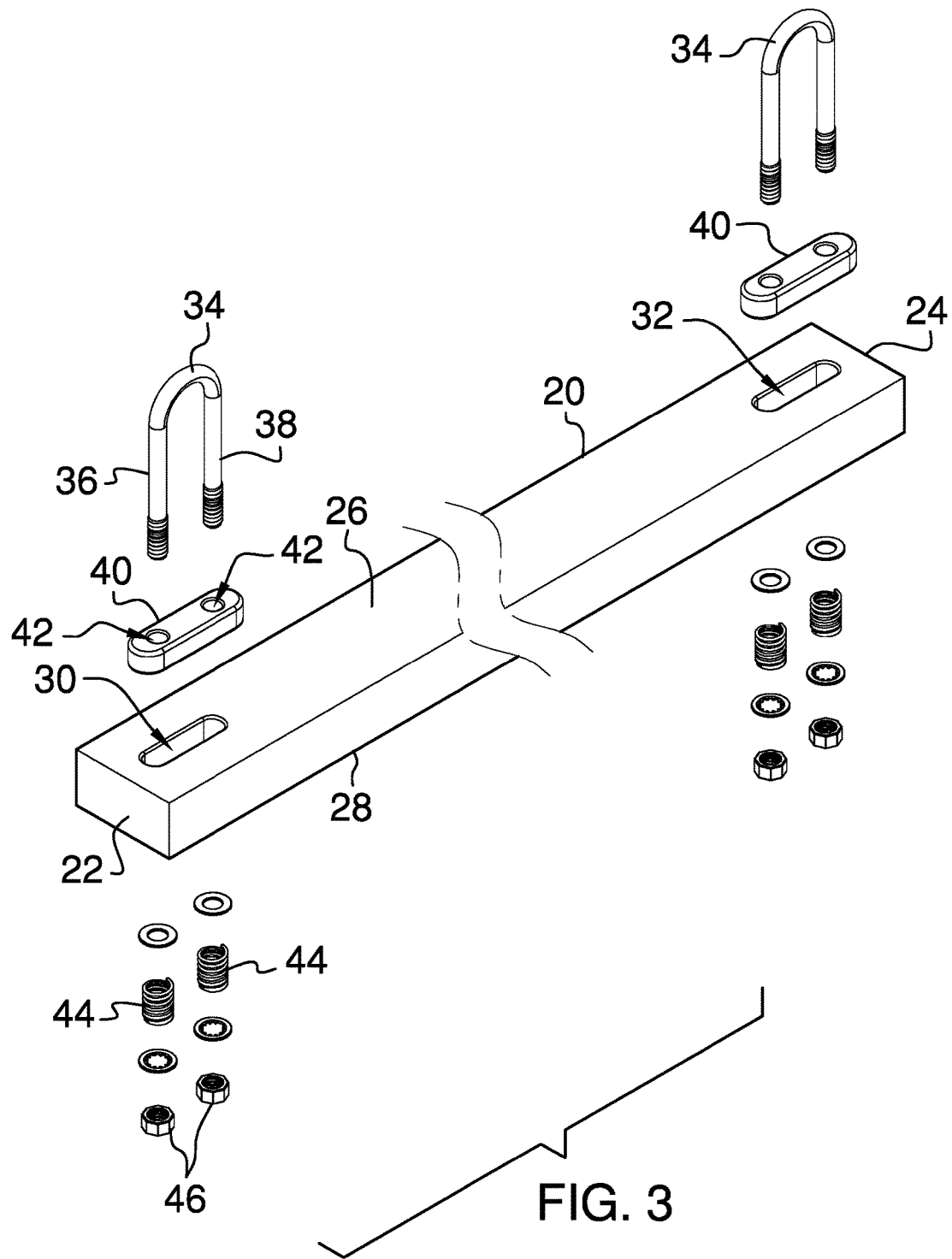
FIG. 3 is an exploded view of a bar of an embodiment of the disclosure.
Figure 4:
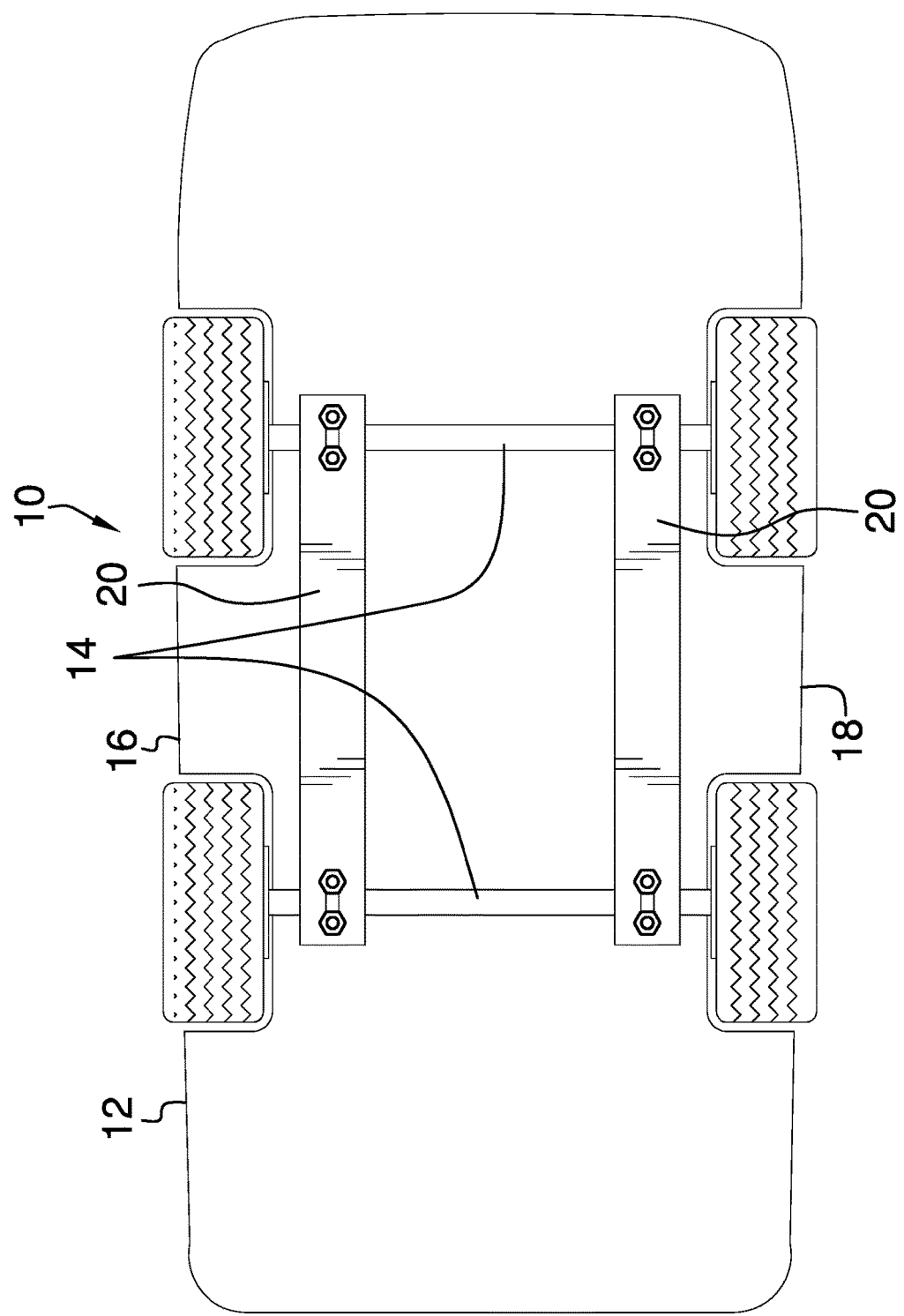
FIG. 4 is a bottom perspective in-use view of an embodiment of the disclosure.

With reference now to the drawings, and in particular to FIGS. 1 through 4 thereof, a new jacking device embodying the principles and concepts of an embodiment of the disclosure and generally designated by the reference numeral 10 will be described.

As best illustrated in FIGS. 1 through 4, the trailer jacking system 10 generally comprises a trailer 12 that has a pair of axles 14, a first lateral side 16 and a second lateral side 18. A pair of bars 20 is provided and each of the bars 20 is coupled between each of the axles 14. Moreover, a jack is selectively positioned beneath a selected one of the bars 20 for jacking the trailer 12. Each of the bars 20 is oriented collinear with an associated one of the first 16 and second 18 lateral sides. In this way each of the bars 20 facilitates the trailer 12 to be leveled between the first 16 and second 18 lateral sides when the trailer 12 is jacked. The trailer 12 may be a camper, a cargo trailer 12 or any other type of trailer 12.

Each of the bars 20 has a first end 22, a second end 24, a top side 26 and a bottom side 28. Each of the bars 20 is elongated between the top 26 and bottom 28 sides. Additionally, each of the bars 20 has a first slot 30 extending through the top and bottom side 28s. The first slot 30 is positioned closer to the first end 22 than the second end 24. Each of the bars 20 has a second slot 32 extending through the top 26 and bottom 28 sides and the second slot 32 is positioned closer to the second end 24 than the first end 22.

A plurality of u-bolts 34 is provided and each of the u-bolts 34 bolts is coupled between the bars 20 and an associated one of the axles 14 to retain the bars 20 on the axles 14. Each of the u-bolts 34 has a first arm 36 and a second arm 38. Moreover, each of the u-bolts 34 is curved between the first 36 and second 38 arms such that the first arm 36 corresponding to each of the u-bolts 34 is spaced from the second arm 38 of the corresponding u-bolt 34.

Each of the u-bolts 34 is positioned on an associated one of the axles 14 having the first 36 and second 38 arms corresponding to each of the u-bolts 34 being extended through each of a corresponding one of the first 30 and second 32 slots in an associated one of the bars 20. A plurality of cushions 40 is provided that each has a pair of holes 42 extending therethrough. Each of the first 36 and second 38 arms of a corresponding one of the u-bolts 34 is extended through associated ones of the holes 42 in an associated one of said cushions 40. The associated cushion 40 is positioned on the top side 26 of the bar 20. Each of the cushions 40 is compressed between the bar 20 and a corresponding one of the axles 14 when the bar 20 is positioned on the u-bolts 34.

A plurality of biasing members 44 is provided and each of the biasing members 44 is positioned around a corresponding one of the first 36 and second 38 arms of an associated one of the u-bolts 34. Each of the biasing members 44 is positioned on the bottom side 28 of the bar 44. A plurality of fasteners 46 is provided and each of the fasteners 46 threadably engages a corresponding one of the first 36 and second 38 arms of an associated one of the u-bolts 34. Each of the fasteners 46 compresses an associated one of the biasing members 44 between the fasteners 46 and the bar 20 when the fasteners 46 are tightened on the associated u-bolt 34. In this way the plurality of fasteners 46 retains each of the bars 20 on the axles 14. Each of the fasteners 46 may be a nut or the like, and a plurality of lock washers may be provided.

In use, each of the bars 20 is coupled between the pair of axles 14 and each of the bars 20 is aligned with an associated one of the first 16 and second 18 lateral sides of the trailer 12. The jack is positioned beneath a selected one of the bars 20 when the trailer 12 needs to be leveled and jacked for maintenance. The jack is manipulated to lift the selected bar 20 thereby facilitating the weight of the trailer 12 to be evenly distributed between the pair of axles 14. Additionally, each of the bars 20 facilitates a camper to be leveled without requiring the camper to be driven onto blocks or the like. In this way an individual may level the camper without assistance. Each of the bars 20 and the attendant hardware are removable from the axles 14 at any time.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trailer jacking system comprising:
   a trailer having a pair of axles, a first lateral side and a second lateral side; and
   a pair of bars, each of said bars being coupled between each of said axles wherein each of said bars is configured to have a jack positioned therebeneath for jacking said trailer, each of said bars being oriented collinear with an associated one of said first and second lateral sides wherein each of said bars is configured to facilitate the trailer to be leveled between said first and second lateral sides when said trailer is jacked, each of said bars having a first end, a second end, a top side and a bottom side, each of said bars being elongated between said top and bottom sides, each of said bars having a first slot extending through said top and bottom sides, said first slot being positioned closer to said first end than said second end, each of said bars having a second slot extending through said top and bottom sides, said second slot being positioned closer to said second end than said first end; and
   a plurality of u-bolts, each of said u-bolts bolts being coupled between said bars and an associated one of said axles to retain said bars on said axles.

2. The system according to claim 1, wherein each of said u-bolts has a first arm and a second arm, each of said u-bolts being curved between said first and second arms such that said first arm corresponding to each of said u-bolts is spaced from said second arm of said corresponding u-bolt, each of said u-bolts being threaded adjacent to said first and second arms.

3. A trailer jacking system comprising:
   a trailer having a pair of axles, a first lateral side and a second lateral side; and
   a pair of bars, each of said bars being coupled between each of said axles wherein each of said bars is configured to have a jack positioned therebeneath for jacking said trailer, each of said bars being oriented collinear with an associated one of said first and second lateral sides wherein each of said bars is configured to facilitate the trailer to be leveled between said first and second lateral sides when said trailer is jacked;
   a plurality of u-bolts, each of said u-bolts bolts being coupled between said bars and an associated one of said axles to retain said bars on said axles, each of said u-bolts having a first arm and a second arm, each of said u-bolts being curved between said first and second arms such that said first arm corresponding to each of said u-bolts is spaced from said second arm of said corresponding u-bolt, each of said u-bolts being threaded adjacent to said first and second arms;
   each of said bars has a first slot and a second slot; and
   each of said u-bolts is positioned on an associated one of said axles having said first and second arms corresponding to each of said u-bolts being extended through each of a corresponding one of said first and second pairs of slots in an associated one of said bars.

4. A trailer jacking system comprising:
   a trailer having a pair of axles, a first lateral side and a second lateral side; and
   a pair of bars, each of said bars being coupled between each of said axles wherein each of said bars is configured to have a jack positioned therebeneath for jacking said trailer, each of said bars being oriented collinear with an associated one of said first and second lateral sides wherein each of said bars is configured to facilitate the trailer to be leveled between said first and second lateral sides when said trailer is jacked;
   a plurality of u-bolts, each of said u-bolts bolts being coupled between said bars and an associated one of said axles to retain said bars on said axles, each of said u-bolts having a first arm and a second arm, each of said u-bolts being curved between said first and second arms such that said first arm corresponding to each of said u-bolts is spaced from said second arm of said corresponding u-bolt, each of said u-bolts being threaded adjacent to said first and second arms; and
   a plurality of cushions each having a pair of holes extending therethrough, each of said first and second arms of a corresponding one of said u-bolts being extended through associated ones of said holes in a corresponding one of said cushions such that each of said cushions is positioned on said top side of said bar, each of said cushions being compressed between said bar and a corresponding one of said axles when said bar is positioned on said u-bolts.

5. A trailer jacking system comprising:
a trailer having a pair of axles, a first lateral side and a second lateral side; and
a pair of bars, each of said bars being coupled between each of said axles wherein each of said bars is configured to have a jack positioned therebeneath for jacking said trailer, each of said bars being oriented collinear with an associated one of said first and second lateral sides wherein each of said bars is configured to facilitate the trailer to be leveled between said first and second lateral sides when said trailer is jacked;
a plurality of u-bolts, each of said u-bolts bolts being coupled between said bars and an associated one of said axles to retain said bars on said axles, each of said u-bolts having a first arm and a second arm, each of said u-bolts being curved between said first and second arms such that said first arm corresponding to each of said u-bolts is spaced from said second arm of said corresponding u-bolt, each of said u-bolts being threaded adjacent to said first and second arms; and
a plurality of biasing members, each of said biasing members being positioned around a corresponding one of said first and second arms of an associated one of said u-bolts, each of said biasing members being positioned on a bottom side of said bar.

6. The system according to claim 5, further comprising a plurality of fasteners, each of said fasteners threadably engaging a corresponding one of said first and second arms of an associated one of said u-bolts, each of said fasteners compressing an associated one of said biasing members between said fasteners and said bar when said fasteners are tightened on said associated u-bolt, said plurality of fasteners retaining each of said bars on said axles.

7. A trailer jacking system comprising:
a trailer having a pair of axles, a first lateral side and a second lateral side; and
a pair of bars, each of said bars being coupled between each of said axles wherein each of said bars is configured to have a jack positioned therebeneath for jacking said trailer, each of said bars being oriented collinear with an associated one of said first and second lateral sides wherein each of said bars is configured to facilitate the trailer to be leveled between said first and second lateral sides when said trailer is jacked, each of said bars having a first end, a second end, a top side and a bottom side, each of said bars being elongated between said top and bottom sides, each of said bars having a first slot extending through said top and bottom sides, said first slot being positioned closer to said first end than said second end, each of said bars having a second slot extending through said top and bottom sides, said second slot being positioned closer to said second end than said first end;
a plurality of u-bolts, each of said u-bolts bolts being coupled between said bars and an associated one of said axles to retain said bars on said axles, each of said u-bolts having a first arm and a second arm, each of said u-bolts being curved between said first and second arms such that said first arm corresponding to each of said u-bolts is spaced from said second arm of said corresponding u-bolt, each of said u-bolts being threaded adjacent to said first and second arms, each of said u-bolts being positioned on an associated one of said axles having said first and second arms corresponding to each of said u-bolts being extended through each of a corresponding one of said first and second pairs of slots in an associated one of said bars;
a plurality of cushions each having a pair of holes extending therethrough, each of said first and second arms of a corresponding one of said u-bolts being extended through associated ones of said holes in a corresponding one of said cushions such that each of said cushions is positioned on said top side of said bar, each of said cushions being compressed between said bar and a corresponding one of said axles when said bar is positioned on said u-bolts;
a plurality of biasing members, each of said biasing members being positioned around an corresponding one of said first and second arms of an associated one of said u-bolts, each of said biasing members being positioned on said bottom side of said bar; and
a plurality of fasteners, each of said fasteners threadably engaging a corresponding one of said first and second arms of an associated one of said u-bolts, each of said fasteners compressing an associated one of said biasing members between said fasteners and said bar when said fasteners are tightened on said associated u-bolt, said plurality of fasteners retaining each of said bars on said axles.

* * * * *